United States Patent
Lin et al.

(10) Patent No.: US 9,815,155 B2
(45) Date of Patent: Nov. 14, 2017

(54) RECONFIGURABLE ASSEMBLY WORK STATION

(71) Applicant: GM GLOBAL TECHNOLOGY OPERATIONS LLC, Detroit, MI (US)

(72) Inventors: Yhu-Tin Lin, Rochester Hills, MI (US); Jeffrey A. Abell, Rochester Hills, MI (US); John Patrick Spicer, Plymouth, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 334 days.

(21) Appl. No.: 14/674,687

(22) Filed: Mar. 31, 2015

(65) Prior Publication Data

US 2016/0288280 A1    Oct. 6, 2016

(51) Int. Cl.
*B23P 21/00* (2006.01)
*G05B 19/418* (2006.01)
(Continued)

(52) U.S. Cl.
CPC ............. *B23P 21/00* (2013.01); *B23P 21/002* (2013.01); *B23P 21/004* (2013.01); *B25J 5/007* (2013.01); *B25J 9/0018* (2013.01); *B25J 9/0093* (2013.01); *B25J 9/0096* (2013.01); *B25J 15/04* (2013.01); *B25J 19/023* (2013.01);
(Continued)

(58) Field of Classification Search
CPC ....... B23P 21/004; B23P 21/002; B23P 21/00; Y10T 29/49829; Y10T 29/53365; Y10T 29/53539; Y10T 29/53048; Y10T 29/53091; Y10T 29/53052;
(Continued)

(56) References Cited

U.S. PATENT DOCUMENTS 5,539,975 A * 7/1996 Kukuljan .............. B23P 21/004
                                                    198/346.2
5,692,867 A * 12/1997 Kondo .................. B23P 19/001
                                                    414/268

(Continued)

FOREIGN PATENT DOCUMENTS

CN   101579792 A   11/2009
CN   102671870 A    9/2012
(Continued)

*Primary Examiner* — Jermie Cozart
(74) *Attorney, Agent, or Firm* — Quinn IP Law (57) ABSTRACT

A reconfigurable autonomous workstation includes a multi-faced superstructure including a horizontally-arranged frame section supported on a plurality of posts. The posts form a plurality of vertical faces arranged between adjacent pairs of the posts, the faces including first and second faces and a power distribution and position reference face. A controllable robotic arm suspends from the rectangular frame section, and a work table fixedly couples to the power distribution and position reference face. A plurality of conveyor tables are fixedly coupled to the work table including a first conveyor table through the first face and a second conveyor table through the second face. A vision system monitors the work table and each of the conveyor tables. A programmable controller monitors signal inputs from the vision system to identify and determine orientation of the component on the first conveyor table and control the robotic arm to execute an assembly task.

15 Claims, 4 Drawing Sheets

(51) Int. Cl.
*B25J 5/00* (2006.01)
*B25J 9/00* (2006.01)
*B25J 15/04* (2006.01)
*B25J 19/02* (2006.01)

(52) U.S. Cl.
CPC ... *G05B 19/4182* (2013.01); *G05B 19/41815* (2013.01); *Y10T 29/49829* (2015.01); *Y10T 29/49904* (2015.01); *Y10T 29/53048* (2015.01); *Y10T 29/53052* (2015.01); *Y10T 29/53091* (2015.01); *Y10T 29/53365* (2015.01); *Y10T 29/53539* (2015.01)

(58) Field of Classification Search
CPC ........ Y10T 29/49904; G05B 19/41815; G05B 19/4182; G05B 19/41805
See application file for complete search history.

(56) References Cited

U.S. PATENT DOCUMENTS

| | | | |
|---|---|---|---|
| 5,930,144 A | 7/1999 | Kondo et al. | |
| 8,327,531 B2* | 12/2012 | Ono | B23P 21/004 29/429 |
| 2008/0253871 A1* | 10/2008 | Bergeron | B23P 21/004 414/281 |
| 2009/0118858 A1* | 5/2009 | Wallace | B23P 19/001 700/110 |
| 2011/0258847 A1 | 10/2011 | Meisho et al. | |

FOREIGN PATENT DOCUMENTS

| | | |
|---|---|---|
| CN | 202922583 U | 5/2013 |
| DE | 1020111079 A1 | 1/2013 |
| EP | 0381185 A2 | 8/1990 |
| EP | 0704780 B1 | 1/2002 |

* cited by examiner

RECONFIGURABLE ASSEMBLY WORK STATION

GOVERNMENT LICENSE RIGHTS

This invention was made with government support under contract number DE-EE-0002217 awarded by the Department of Energy. The government has certain rights in the invention.

TECHNICAL FIELD

The present disclosure relates to work stations for assembling components.

BACKGROUND

Manufacturing processes may employ robotic arms to assemble components into assembled products. By way of example, modular battery devices may be assembled with robotic arms. Other elements that may be assembled using robotic arms include, by way of example, electronic devices and related components, household appliances, building materials, vehicles, furniture and medical devices, among others. A robot assembly includes at least one movable robotic arm capable of performing an action on a part. Known robotic assembly processes employ precision tooling, fixtures or pallets to present components to the robotic arm at precise positions and orientations for assembly. Such tooling and fixturing may be part-specific, and thus restrict the flexibility of the robotic assembly to a specific or single apparatus.

SUMMARY

A reconfigurable autonomous workstation for assembling components into an assembled product is described, and includes a multi-faced superstructure including a horizontally-arranged frame section supported on a plurality of posts. The posts form a plurality of vertical faces arranged between adjacent pairs of the posts, the faces including first and second faces and a power distribution and position reference face. A controllable robotic arm suspends from the rectangular frame section, and a work table fixedly couples to the power distribution and position reference face. A plurality of conveyor tables are fixedly coupled to the work table including a first conveyor table through the first face and a second conveyor table through the second face. A vision system monitors the work table and each of the conveyor tables. A programmable controller is configured to monitor signal inputs from the vision system to identify and determine orientation of the component on the first conveyor table, control the robotic arm to pick the component from the first conveyor table and execute an assembly task with the component at the work table to produce a work product, determine the work product is an assembled product, and control the robotic arm to transport the assembled product onto the second conveyor table.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which.

DETAILED DESCRIPTION

Figure 1:
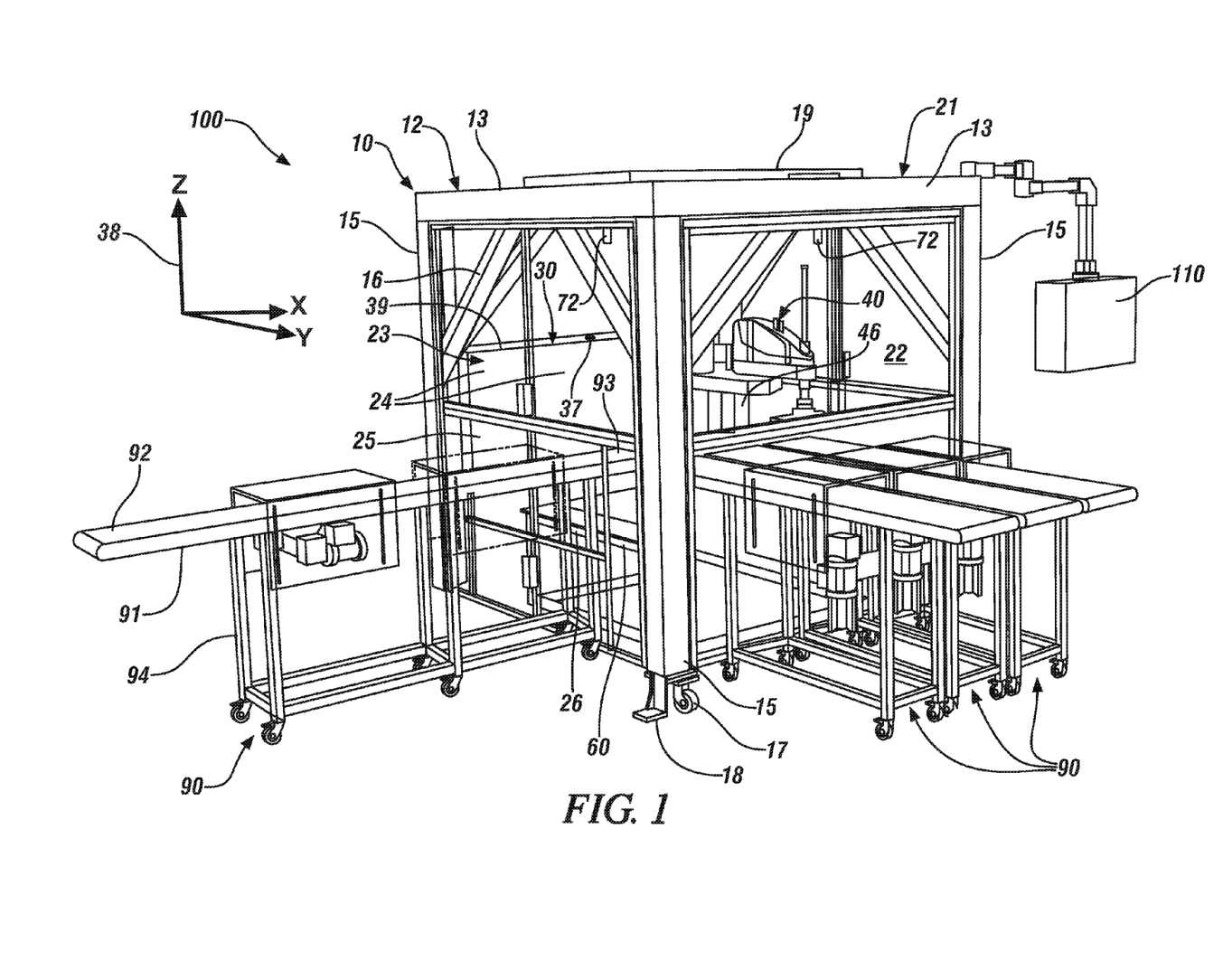
FIG. 1 provides an isometric view of an embodiment of an autonomous portable reconfigurable modular workstation (workstation), in accordance with the disclosure.
Figure 2:
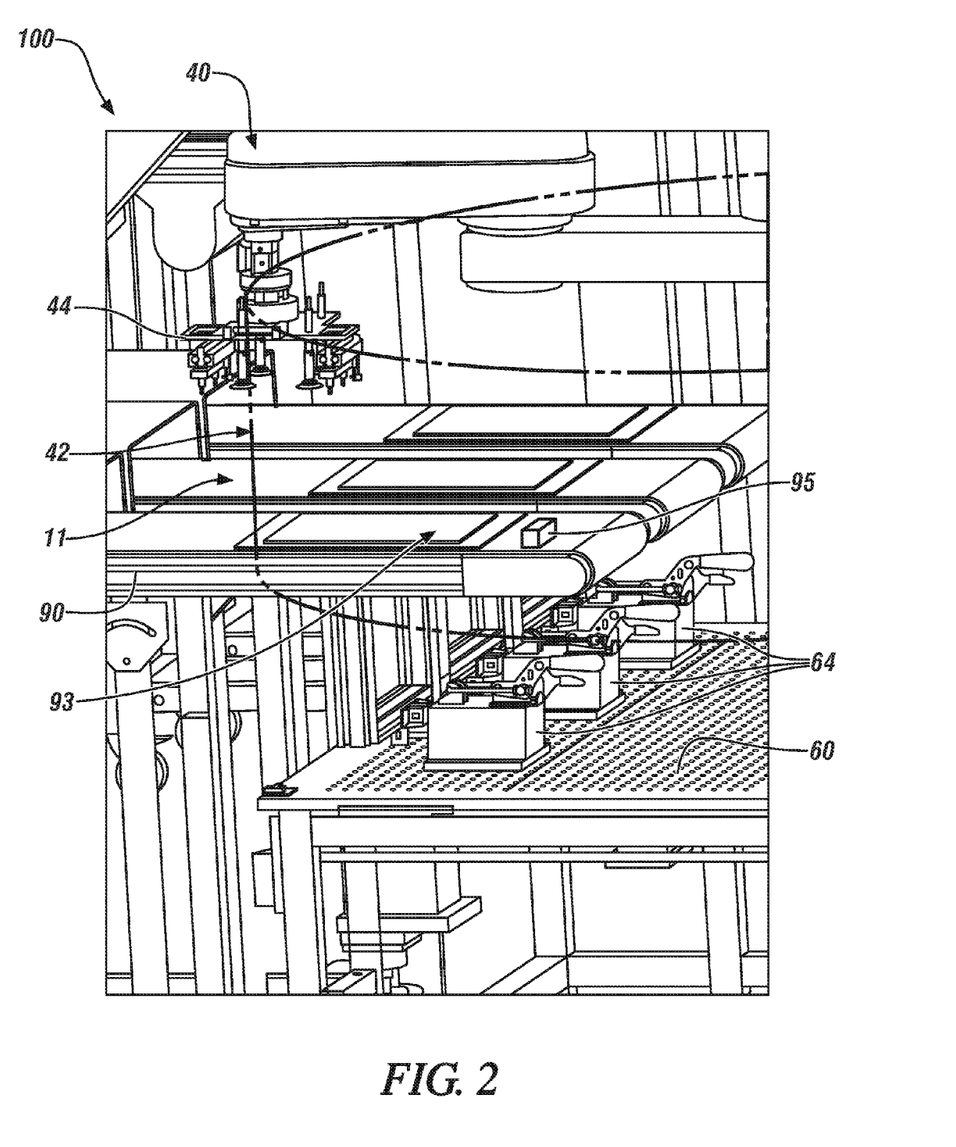
FIG. 2 provides an isometric view of a portion of the workstation, in accordance with the disclosure.
Figure 3:
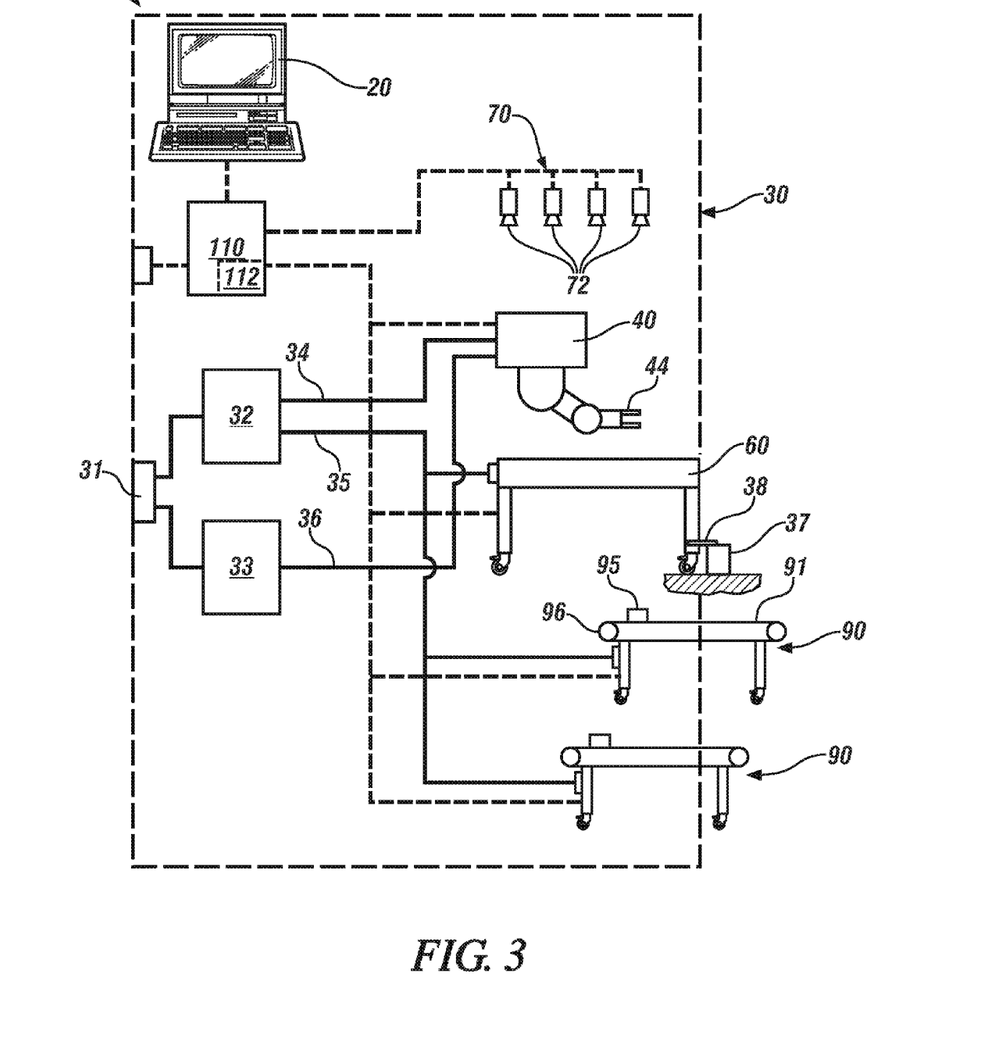
FIG. 3 schematically shows a plan view of a power and signal distribution scheme for the workstation, in accordance with the disclosure.

Referring now to the drawings, wherein the depictions are for the purpose of illustrating certain exemplary embodiments only and not for the purpose of limiting the same, FIG. 1 provides an isometric view of an embodiment of an autonomous portable reconfigurable modular workstation (workstation) 100, FIG. 2 provides an isometric view of a portion of the embodiment of the workstation 100, and FIG. 3 schematically shows a plan view of a power and signal distribution scheme for the embodiment of the workstation 100. The workstation 100 preferably includes a multi-faced superstructure 10 supporting a robotic arm 40 that acts upon components supplied through conveyor tables 90 at a work table 60 employing information supplied from a vision system 70, some or all of which communicates with a controller 110 that signally connects to an operator interface device 20. The workstation 100 may be employed to assemble a plurality of components into an assembled product. Like numerals indicate like or corresponding parts throughout the several views. As described herein, the workstation 100 is autonomous in that, after a setup procedure is completed, it is capable of executing and completing an assembly task to generate an assembled product from supplied components without further input from external sources or interaction with an operator. The workstation 100 is reconfigurable in that actions of the robotic arm 40, conveyor tables 90 and work table 60 may all be configured to execute different assembly tasks to generate different assembled products. The workstation 100 is portable in that it may be easily transported to different locations in a manufacturing plant without employing heavy equipment or overhead cranes. The workstation 100 is modular in that it contains all necessary elements to accomplish an assembly task when power is provided from centralized systems. As used herein, the term 'component' is defined as any structural entity that is input to the workstation 100 for inclusion in an assembled product. As used herein, the term 'assembled product' is defined as any structural entity that is output from the workstation 100 after assembly.

The multi-faced superstructure 10 includes a horizontally-arranged frame section 12 that is preferably supported on a plurality of equal-length load-bearing posts 15. In one non-limiting embodiment, the frame section 12 is configured as a square having four sides 13 approximately six feet (1.9 m) in length fabricated from 4 inch tube steel stock. The posts 15 are preferably placed at an outer periphery of the frame section 12, e.g., at the corners, and the frame section 12 is assembled onto upper ends of the posts 15 with reinforcing braces 16 arranged between the sides 13 and the posts 15. An outer periphery formed by the posts 15 and the frame section 12 defines outer bounds of a three-dimensional workspace 11. Lower ends of each of the posts 15 are preferably fitted with casters 17 and tie-down feet 18. The casters 17 may be employed to transport the workstation 100 to a desired location. The tie-down feet 18 are employed to fixedly attach the workstation 100 to floor anchors at a specified location, e.g., on a plant floor, with an added capability of subsequently moving the workstation 100 to another location by detaching the tie-down feet 18 from the floor anchors. The frame section 12 structurally supports a base section 19 therewithin employing joists, trusses, or other suitable structural members. The base section 19 provides structural support for a robotic arm 40.

The superstructure 10 of the workstation 100 includes a plurality of vertical faces that are defined between adjacent posts 15. The vertical faces are configured for inputting components, outputting the assembled products, and supporting power distribution modules, control modules and position references. As shown and in one embodiment the workstation 100 includes a first face 21, a second face 22, a third face 23 and a fourth face 30. Each of the first face 21, the second face 22 and the third face 23 may be similarly or identically configured to permit interchangeability to input components or output assembled products, depending upon the intended assembled product of the workstation 100. Such an arrangement facilitates configuration of the workstation 100 to combine components into the intended assembled product.

The first, second and third faces 21, 22, 23 each preferably includes one or more upper access panel(s) 24 and one or more lower access panel(s) 25. When one of the first, second and third faces 21, 22, 23 is not in use, the upper access panel(s) 24 and the lower access panel(s) 25 close off and prohibit physical access to the workspace 11, while permitting visual access to view operation of the workstation 100. Each of the upper access panel(s) 22 preferably includes a transparent panel formed from acrylic or similar material that is supported in a frame that is attached to one of the posts 15 by a hinge, and preferably opens outwardly to permit access. Preferably, each of the first, second and third faces 21, 22, 23 has a pair of opposed upper access panels 24 that butt together in the middle and together span the width between the posts 15, as is best shown in FIG. 1. Each of the lower access panel(s) 25 preferably includes a transparent panel formed from acrylic or similar material that is supported in a frame that is attached to one of the posts 15 by a hinge or another suitable mechanism. The lower access panel(s) 25 may include one or more sliding, hinged or removable door panel(s) 26 that may accommodate one or more conveyor tables 90. As shown with reference to FIG. 1, the first face 21 is unused, and thus the upper access panel(s) 24 and the lower access panel(s) 25 are closed. As shown with reference to FIG. 1, the second face 22 includes three conveyor tables 90, and thus the upper access panel(s) 24 are closed and three of the door panels 26 are removed from the lower access panel(s) 25 to accommodate the three conveyor tables 90. As shown with reference to FIG. 1, the third face 23 includes one conveyor table 90, and thus the upper access panel(s) 24 are closed and one of the door panels 26 is removed from the lower access panel 25 to accommodate the single conveyor table 90.

The fourth face 30 is a power distribution and position reference face that is employed for integrating power inputs, control, and location references into the workstation 100. As best shown with reference to FIG. 3, the fourth face 30 preferably includes one or more power distribution panels for channeling power in the form of electrical, pneumatic, hydraulic, and/or vacuum power to the robotic arm 40 and the conveyor tables 90. The power distribution panels preferably include an electrical power distribution panel 32 and may include one or more second power distribution panels 33 for distributing pneumatic, hydraulic, and/or vacuum power as required. As shown, the second power distribution panel 33 may be employed to distribute vacuum power via fluidic tubes 36 to the robotic arm 40 and the work table 60. The electrical, pneumatic, hydraulic, and/or vacuum powers preferably originate from corresponding outside sources, and are channeled to the physical location of the workstation 100 using suitable electrical power cables or fluidic tubes arranged in a parallel flow configuration through a single conduit assembly having a single plant multi-power coupler. A corresponding workstation multi-power coupler 31 connects to the single plant multi-power coupler, and includes suitable electrical power cables and fluidic tubes that conduct the corresponding electrical, pneumatic, hydraulic, and/or vacuum power to the corresponding power distribution panel for distribution to the robotic arm 40, the work table 60 and each of the conveyor tables 90 as required. The single plant multi-power coupler and the workstation multi-power coupler 31 include corresponding male/female electrical connectors and fluidic couplers. In one embodiment, only an electrical power distribution panel 32 is employed and the pneumatic, hydraulic, and/or vacuum power tubes directly couple to the robotic arm 40 when such power is not employed elsewhere in the workstation 100.

The electrical power distribution panel 32 preferably includes power outlet conductors including a first cable 34 supplying electrical power to the robotic arm 40 and a plurality of second cables 35 configured to individually supply electrical power to each of the conveyor tables 90. In one embodiment, the electrical power supplied to the robotic arm 40 is three-phase electrical power at a nominal 240V charge, and the electrical power supplied to the conveyor tables 90 is single-phase electrical power at a nominal 120V charge, and the electrical power distribution panel 32 is configured to supply both three-phase electrical power and single-phase electrical power from the incoming electric power source. The second cables 35 are flexible power-conducting cables each having a connector on a distal end, and extend to couple with a corresponding electrical connector for one of the conveyor tables 90. As such, in the configuration shown with reference to FIG. 1, there are preferably a quantity of nine second cables 35 to accommodate a configuration of the workstation 100 that includes an assembly task employing all of the potential conveyor tables 90.

The fourth side 30 further includes a physical reference location 37 for the workstation 100, which provides a point of origin for an x-y-z coordinate system 38 associated with the workstation 100. The reference location 37 preferably is located on a docking beam 39 that spans between the two posts 15 associated with the fourth face 30. The docking beam 39 may be a steel U- or L-beam that is welded or otherwise fixedly attached to the two posts 15, or another suitable mechanism to fixedly attach the assembly table 60 to a pre-defined location relative to the workstation 100.

The robotic arm 40 is preferably suspended from the base section 19 into a three-dimensional (3D) space defined within the superstructure 10 of the workstation 100. Preferably, the robotic arm 40 has a range of motion 42 that enables an attached end-effector 44 to have access to contiguous conveyor tables 90, the work table 60 and a tool docking table 46. In one embodiment, the robotic arm 40 is centrally located on a plane defined by the frame section 12. The robotic arm 40 may be any suitable controllable device having multi-dimensional positioning capability within the range of motion 42. The robotic arm 40 may be a Cartesian arm having multiple prismatic joints that are defined in context of a Cartesian coordinate system. Alternatively, the robotic arm 40 may be a spherical arm having axes defined in context of a polar coordinate system. Alternatively, the robotic arm 40 may be an articulated arm having rotary joints. Alternatively, the robotic arm 40 may be a parallel device having multiple articulated arms operating in concert at a common end joint. Alternatively, the robotic arm 40 may be an anthropomorphic device having a plurality of independently controllable multi-faceted digits.

Preferably the robotic arm 40 is configured to engage and employ any one of a plurality of interchangeable end-effectors 44, wherein the end-effectors 44 each have some pre-defined capability to execute assembly tasks. The end-effectors 44 may be stored on the tool docking table 46 located within the range of motion 42 of the robotic arm 40 when not in use. As employed herein, assembly tasks are those operations that act upon a component without altering the integrity of that component. Exemplary assembly tasks include picking, transferring, stacking and fastening, amongst others. Exemplary manufacturing operations that are outside the scope of assembly tasks include machining, metal forming, casting and heat treating amongst others. As such, the robotic arm 40 may be any suitable device that may employ a single one or a plurality of the end-effectors 44 for pick-and-place operations, fastening operations, sealant application operations and other assembly tasks.

The work table 60 is a portable, configurable device that fixedly couples to the docking beam 39 using detachable fixture devices such as clamps, over-center linkages or other devices. The work table 60 fixedly couples to the docking beam 39 and is thus oriented to the reference location 37 and the x-y-z coordinate system 38 associated with the workstation 100. The work table 60 provides a platform for one or a plurality of assembly fixtures on which the robotic arm 40 may place a component to perform assembly tasks, thus generating a work product. As employed herein, the term 'work product' is defined as a work piece that is located on the work table 60 and includes one or more components. The work product may be an intermediate work piece on which the robotic arm 40 may be working. A work product transforms to an assembled product when the robotic arm 40 has completed its assembly steps and the only remaining step includes moving it off the work table 60 and onto one of the conveyor tables 90. The work table 60 provides a platform with a grid pattern of mounting holes for one or a plurality of conveyor docking fixtures 64, which are employed reconfigurably to dock and thus fixedly connect and orient each of the conveyor tables 90 to the work table 60.

Each of the conveyor tables 90 preferably includes a horizontally-oriented continuous conveyor belt 91 that is mounted on an adjustable stand 94 mounted on casters for ease of setup and under other conditions. The conveyor belt 91 has a first end 92 and a second end 93, wherein the second end 93 is located within the range of motion 42 of the robotic arm 40 when the conveyor table 90 is fixedly connected to the work table 60. The first end 92 of the conveyor belt 91 may be located to receive components from a loading station prior to assembly in the workstation 100, or may be located near an off-loading station to transport assembled products from the workstation 100 to a packing location, or may be located to provide the assembled product from the workstation 100 as a component that is input to an adjacent workstation. Such operation is shown with reference to FIGS. 4 through 6. Each of the conveyor tables 90 may have a translucent channel guard mounted overtop that connects to the workstation 100.

The conveyor belt 91 is preferably operated by a controllable electric motor 96 that electrically connects to one of the second cables 35 that connects to the electrical power distribution panel 32. A proximity sensor 95 may be suitably located near the second end 93 or the first end 92 of the conveyor belt 91 and arranged to monitor and detect presence of one of the components. The proximity sensor 95 may employ any suitable sensing technology capable of detecting presence or absence of the component at a specific location, including, by way of non-limiting examples, a photo-electric sensor or a strain/pressure/weight detector. The proximity sensor 95 communicates with a motor controller for the electric motor 96, implementing a control scheme that includes operating the electric motor 96 to move the conveyor belt 91 so long as a component is not sensed, and deactivates the electric motor 96 to stop movement of the conveyor belt 91 when a component is sensed, preferably placing the component within the range of motion 42 of the robotic arm 40. In this manner, each conveyor table 90 operates autonomously because its operation is not dependent upon actions of other elements in the workstation 100. Alternatively or in addition, a digital camera 72 of the vision system 70 may monitor the second end 93 of the conveyor belt 91 to detect presence of one of the components and control operation of the conveyor belt 91 in accordance therewith.

The adjustable stand 94 includes a plurality of spring-loaded, height-adjustable legs, with the heights of the legs being adjusted manually by an operator in one embodiment. Such a configuration permits rapid adjustments to the adjustable stand 94 that needs to accommodate the height of components or work products entering or exiting the workstation 100.

A vision system 70 includes a plurality of digital cameras 72 that communicatively connect to the controller 110. Each camera 72 is placed in the workstation 100 to record and monitor a field of view (FOV) that includes the work table 60 or one of the second ends 93 of the conveyor belts 91 located within the range of motion 42 of the robotic arm 40. Furthermore, one of the digital cameras 72 may be located onto the robotic arm 40. Alternatively, one or a plurality of the digital camera(s) 72 may be located in any suitable position so long as there is capability to provide vision line tracking operation. Each of the cameras 72 is preferably a digital image recording device capable of capturing a two-dimensional (2D) or three-dimensional (3D) image of the FOV at a predefined resolution and at a predetermined repetition rate, which is 30 frames per second in one embodiment. By way of definition, an image is any visually perceptible depiction representing the FOV. An image may encompass all or a portion of reflected light in the FOV from a visual light spectrum in one embodiment, including a red-green-blue (RGB) reflection, a black-and-white reflection, a grayscale reflection, or any other suitable or desirable light reflection. Preferably, the image is captured and recorded in a non-transitory storage medium, such as in a non-transitory digital data storage medium that communicates with the controller 110. The image may include one of the components that has entered the FOV of one of the cameras 72. The component is a structural entity having features including by way of example spatial dimensions, materials and surface finishes indicating reflectivity, among others, such that the component is recognizable in the image, along with its position and orientation. Thus the position and orientation of the component in the image may be discerned sufficient for the robotic arm 40 to engage it, including picking it up. In one embodiment, the image captured by the camera 72 is a bitmap image file in the form of an 8-bit grey scale image that represents the FOV. Other embodiments of the image may include a multi-color image represented by Hue-Saturation-Intensity (HSI triplets) or Red, Green, and Blue (RGB) primary colors of the FOV or other image representations without limitation. The image is converted to a bitmap image file for storage and analysis by routines executed by the controller 110.

The controller 110 is a programmable dedicated electronic device that communicates with the robotic arm 40, the vision system 70, the operator interface device 20 and other devices in the workstation 100. The controller 110 may also communicate with controllers operating other workstations proximal thereto, or with other controllers without limitation. The controller 110 is capable of executing machine-readable instructions 112, including instructions related to monitoring signal inputs from the workstation 100, analyzing the signal inputs, and generating control commands that are communicated to various elements of the workstation 100 such as the robotic arm 40. Such instructions preferably include steps that are associated with monitoring signal inputs from the vision system 70 to identify and determine orientation of a component on one of the conveyor tables 90, controlling the robotic arm 40 to pick the component from the conveyor table 90 and executing an assembly task with the picked component at the work table 60 or another conveyor to produce a work product, determining the work product is an assembled product, and controlling the robotic arm 40 to transport the assembled product onto another one of the conveyor tables 90 for further processing or packing. This may further include iteratively stacking components supplied from one of the conveyor tables 90, e.g., iteratively stacking battery modules, to generate a work product that eventually becomes an assembled product when a desired quantity of components has been stacked.

The terms controller, control module, module, control, control unit, processor and similar terms refer to any one or various combinations of Application Specific Integrated Circuit(s) (ASIC), electronic circuit(s), central processing unit(s), e.g., microprocessor(s) and associated non-transitory memory component in the form of memory and storage devices (read only, programmable read only, random access, hard drive, etc.). The non-transitory memory component is capable of storing machine-readable instructions in the form of one or more software or firmware programs or routines, combinational logic circuit(s), input/output circuit(s) and devices, signal conditioning and buffer circuitry and other components that can be accessed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean any controller-executable instruction sets including calibrations and look-up tables. Each controller executes control routine(s) to provide desired functions, including monitoring inputs from sensing devices and other networked controllers and executing control and diagnostic routines to control operation of actuators. Routines may be executed at regular intervals, for example each 100 microseconds during operation. Alternatively, routines may be executed in response to occurrence of a triggering event. Communications between controllers and between controllers, actuators and/or sensors may be accomplished using a direct wired link, a networked communications bus link, a wireless link or any another suitable communications link. Communications include exchanging data signals in any suitable form, including, for example, electrical signals via a conductive medium, electromagnetic signals via air, optical signals via optical waveguides, and the like. Data signals may include signals representing inputs from sensors, signals representing actuator commands, and communications signals between controllers.

Figure 4:
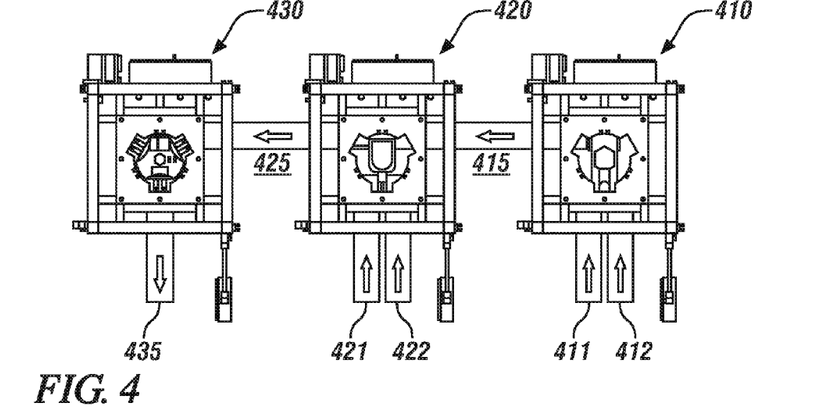
FIG. 4 shows a plan view of an embodiment of a serial arrangement including three autonomously controlled workstations working together to generate a final assembled product, in accordance with the disclosure.
Figure 5:
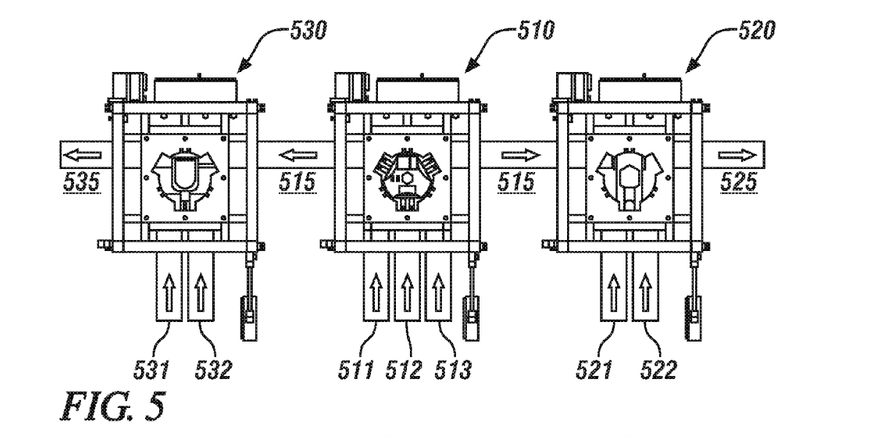
FIG. 5 shows a plan view of a first embodiment of a serial-parallel hybrid arrangement including three autonomously controlled workstations working together to generate final assembled products, in accordance with the disclosure.
Figure 6:
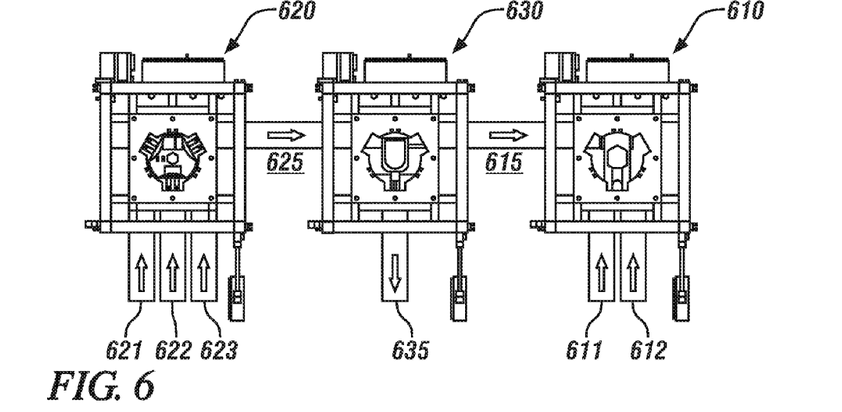
FIG. 6 shows a plan view of a second embodiment of a serial-parallel hybrid arrangement including three autonomously controlled workstations working together to generate a final assembled product, in accordance with the disclosure.

FIGS. 4 through 6 each show a plan view of arrangements of a plurality of autonomously controlled workstations working together to generate a final assembled product. Each of the workstations described in FIGS. 4 through 6 is an embodiment of the workstation 100 described with reference to FIG. 1.

FIG. 4 shows a plan view of an embodiment of a serial arrangement including three workstations 410, 420 and 430. As shown, first and second conveyors supply components 411, 412 to the first workstation 410, which executes assembly tasks with the components 411, 412 to produce a first assembled product 415. The first assembled product 415 is conveyed to the second workstation 420 along with components 421, 422. The second workstation 420 executes assembly tasks with the first assembled product 415 and the components 421, 422 to produce a second assembled product 425, which is conveyed to the third workstation 430. The third workstation 430 executes one or more assembly tasks on the second assembled product 425 to produce a third assembled product 435, which is conveyed away from the third workstation 430 via another conveyor.

FIG. 5 shows a plan view of a first embodiment of a serial-parallel hybrid arrangement including three workstations 510, 520 and 530. As shown, conveyors supply components 511, 512 and 513 to the first workstation 510, which executes assembly tasks with the components 511, 512 and 513 to produce a first assembled product 515. The first assembled product 515 is conveyed to either the second workstation 520 or the third workstation 530, with the second workstation 520 and the third workstation 530 operating in parallel. The second workstation 520 is also supplied with components 521, 522. The second workstation 520 executes assembly tasks with the first assembled product 515 and the components 521, 522 to produce a second assembled product 525, which is conveyed away from the second workstation 520. The third workstation 530 is also supplied with components 531, 532. In one embodiment, the components 531, 532 supplied to the third workstation 530 are the same as the corresponding components 521, 522 supplied to the second workstation 520. Alternatively, the components 531, 532 supplied to the third workstation 530 are different from the corresponding components 521, 522 supplied to the second workstation 520. The third workstation 530 executes one or more assembly tasks on the first assembled product 515 and the components 531, 532 to produce a third assembled product 535, which is conveyed away from the third workstation 530 via another conveyor.

FIG. 6 shows a plan view of a second embodiment of a serial-parallel hybrid arrangement including three workstations 610, 620 and 630. As shown, conveyors supply components 611 and 612 to the first workstation 610, which executes assembly tasks with the components 611 and 612 to produce a first assembled product 615. The first assembled product 615 is conveyed to the third workstation 630. The second workstation 620 is also supplied with components 621, 622 and 623. The second workstation 620 executes assembly tasks with the components 621, 622 and 623 to produce a second assembled product 625, which is conveyed to the third workstation 630. The third workstation 630 executes one or more assembly tasks on the first and second assembled products 615, 625 to produce a third assembled product 635, which is conveyed away from the third workstation 630 via another conveyor.

The concepts described herein include reconfigurable robotic assembly systems, at both system and machine levels, which may be employed for assembly of various products, including in one embodiment, assembly of battery cells for electric vehicle batteries. By way of example, each workstation can be configured to handle one, multiple or all processes related to battery stacking. In turn, the assembly system can be configured with the same kind of assembly machines into scalable parallel, serial, or hybrid assembly lines. The workstation accommodates families of assemblies, e.g., stackable battery assemblies having flat prismatic components assembled into a repeatable and stackable structure. This includes components that include prismatic pouch batteries, prismatic can batteries and cylindrical batteries. Since each workstation in the system can perform any or all processes, the arrangement of workstations can be readily re-balanced to assign different tasks to different workstations. This can be done in order to accommodate the introduction of new workstations in the process to increase capacity, or to accommodate the removal of workstations to reduce capacity, or to re-route production in case of down time. Overall system cost and investment cost may be reduced due to economies of scale because the same machine design is replicated multiple times.

The use of the workstation as described herein serves to eliminate locating and transporting parts on precision pallets, and thus simplifies design and build of other tooling, such as fixtures, containerization and dunnage and eliminates any need for precision conveyance indexing. Such systems also enable system flexibility, scalability and reconfigurability, by reducing effects of a single point assembly system breakdown and thus reduces product scrapping. The use of multiple programmable manipulators/robots in a reconfigurable assembly system may also significantly reduce lead time to accommodate the introduction of new product designs within the same family of products.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

The invention claimed is:

1. A reconfigurable autonomous workstation for assembling components into an assembled product, the workstation comprising:
 a multi-faced superstructure including a horizontally-arranged frame section supported on a plurality of posts, the posts forming a plurality of vertical faces, each face arranged between adjacent pairs of the posts, the faces including first and second faces and a power distribution and position reference face;
 a controllable robotic arm suspended from the horizontally-arranged frame section;
 a work table fixedly coupled to the power distribution and position reference face;
 a plurality of conveyor tables including a first conveyor table fixedly coupled to the work table through the first face and a second conveyor table fixedly coupled to the work table through the second face;
 a vision system monitoring the work table and monitoring each of the conveyor tables; and
 a programmable controller executing a control routine operative to:
  monitor signal inputs from the vision system to identify and determine orientation of a first component on the first conveyor table,
  control the robotic arm to pick the first component from the first conveyor table and execute an assembly task with the first component at the work table to produce a work product,
  determine if the work product is an assembled product, and
  control the robotic arm to transfer the assembled product onto the second conveyor table.

2. The workstation of claim 1, further comprising the controllable robotic arm including one of a plurality of interchangeable end-effectors each configured to execute an assembly task.

3. The workstation of claim 2, wherein the interchangeable end-effectors, each configured to execute an assembly task, comprise the interchangeable end-effectors configured to execute an assembly task comprising one of picking, transferring, stacking and fastening the first component.

4. The workstation of claim 1, wherein the conveyor tables comprise autonomously controlled conveyor tables.

5. The workstation of claim 4, wherein each of the autonomously controlled conveyor tables further comprises a horizontally-oriented continuous conveyor belt mounted on an adjustable stand, wherein the conveyor belt is operated by an electric motor operatively connected to a proximity sensor.

6. The workstation of claim 1, further comprising the plurality of conveyor tables including a third conveyor table fixedly coupled to the work table through the first face; and wherein the programmable controller executes a control routine to:
 monitor signal inputs from the vision system to identify and determine orientation of the first component on the first conveyor table and a second component on the third conveyor table,
 control the robotic arm to pick the first component from the first conveyor table and execute an assembly task with the first component at the work table to produce a work product,
 control the robotic arm to pick the second component from the third conveyor table and execute an assembly task with the second component at the work table to continue to produce the work product,
 determine if the work product is an assembled product, and
 control the robotic arm to transport the assembled product onto the second conveyor table.

7. The workstation of claim 1, further comprising a third conveyor table fixedly coupled to the work table, wherein the programmable controller is configured to:

monitor signal inputs from the vision system to identify and determine an orientation of the first component on the first conveyor table and identify and determine an orientation of a second component on the third conveyor table, control the robotic arm to pick the first component from the first conveyor table and execute an assembly task with the first component and control the robotic arm to pick the second component from the third conveyor table and execute assembly tasks with the first and second components to produce a work product, determine if the work product is an assembled product, and control the robotic arm to transfer the assembled product onto the second conveyor table.

8. The workstation of claim 7, comprising the third conveyor table fixedly coupled to the work table through the first face.

9. The workstation of claim 7, further comprising the multi-faced superstructure including the first and second faces and a third face; wherein the third conveyor table fixedly couples to the work table through the third face.

10. The workstation of claim 1, further comprising each of the posts having a caster attached to its bottom section.

11. The workstation of claim 1, wherein the first conveyor table fixedly coupled to the work table through the first face further comprises the first conveyor table configured to transfer the component to be within a range of motion of the robotic arm and wherein the second conveyor table fixedly coupled to the work table through the second face comprises the robotic arm configured to transport the assembled product to the second conveyor table.

12. An autonomous workstation configurable to assemble components into an assembled product, the workstation comprising:
a multi-faced superstructure including a horizontally-arranged frame section supported on a plurality of posts, the posts forming a plurality of vertical faces, each face arranged between adjacent pairs of the posts, the faces including first, second and third faces and a power distribution and position reference face;
a work table fixedly coupled to the power distribution and position reference face;
a plurality of conveyor tables including a first conveyor table fixedly coupled to the work table through the first face and a second conveyor table fixedly coupled to the work table through the second face;
a vision system monitoring the work table and monitoring each of the conveyor tables;
a controllable robotic arm suspended from the horizontally-arranged frame section and having a range of motion that enables an attached end-effector to access the conveyor tables and the work table; and
a programmable controller configured to monitor signal inputs from the vision system, control the robotic arm to pick a component from one of the conveyor tables, execute an assembly task with the component and transport an assembled product onto one of the conveyor tables in either a first workstation configuration or a second workstation configuration.

13. The autonomous workstation of claim 12, wherein the first workstation configuration comprises the first conveyor table fixedly coupled to the work table through the first face to transfer the component within the range of motion of the robotic arm and the second conveyor table fixedly coupled to the work table through the second face to receive the assembled product transported from the work table.

14. The autonomous workstation of claim 12, wherein the second workstation configuration comprises the second conveyor table fixedly coupled to the work table through the second face to transfer the component within the range of motion of the robotic arm and the first conveyor table fixedly coupled to the work table through the first face to receive the assembled product transported from the work table.

15. An assembly system, comprising:
a plurality of interchangeable autonomous workstations, each workstation including:
a multi-faced superstructure including a horizontally-arranged frame section supported on a plurality of posts, the posts forming a plurality of vertical faces, each face arranged between adjacent pairs of the posts, the faces including first, second and third faces and a power distribution and position reference face;
a work table fixedly coupled to the power distribution and position reference face;
a plurality of conveyor tables including a first conveyor table fixedly coupled to the work table through the first face and a second conveyor table fixedly coupled to the work table through the second face;
a vision system monitoring the work table and monitoring each of the conveyor tables;
a controllable robotic arm suspended from the horizontally-arranged frame section and having a range of motion that enables an attached end-effector to access the conveyor tables and the work table; and
a programmable controller configured to monitor signal inputs from the vision system, control the robotic arm to pick a component from one of the conveyor tables, execute an assembly task with the component and transport an assembled product onto one of the conveyor tables in either a first workstation configuration or a second workstation configuration;
wherein a first of the interchangeable workstations executes a first assembly task with the component to generate a first assembled product; and
wherein a second of the interchangeable workstations executes a second assembly task employing the first assembled product to generate a final assembled product.

* * * * *